United States Patent
Oyama et al.

(10) Patent No.: US 10,109,861 B2
(45) Date of Patent: Oct. 23, 2018

(54) CATHODE MATERIAL FOR LITHIUM-ION SECONDARY BATTERY, CATHODE FOR LITHIUM-ION SECONDARY BATTERY, AND LITHIUM-ION SECONDARY BATTERY

(71) Applicant: SUMITOMO OSAKA CEMENT CO., LTD., Tokyo (JP)

(72) Inventors: Masataka Oyama, Tokyo (JP); Takao Kitagawa, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 15/433,805

(22) Filed: Feb. 15, 2017

(65) Prior Publication Data

US 2018/0097230 A1   Apr. 5, 2018

(30) Foreign Application Priority Data

Sep. 30, 2016 (JP) .................. 2016-192876

(51) Int. Cl.
| | |
|---|---|
| *H01M 4/58* | (2010.01) |
| *H01M 4/136* | (2010.01) |
| *H01M 4/36* | (2006.01) |
| *H01M 4/62* | (2006.01) |
| *H01M 10/0525* | (2010.01) |
| *H01M 10/052* | (2010.01) |
| *H01M 4/02* | (2006.01) |

(52) U.S. Cl.
CPC ......... *H01M 4/5825* (2013.01); *H01M 4/136* (2013.01); *H01M 4/366* (2013.01); *H01M 4/625* (2013.01); *H01M 10/0525* (2013.01); *H01M 10/052* (2013.01); *H01M 2004/028* (2013.01)

(58) Field of Classification Search
CPC .... H01M 4/5825; H01M 4/366; H01M 4/136; H01M 4/625; H01M 10/0525; H01M 2004/028
See application file for complete search history.

(56) References Cited

U.S. PATENT DOCUMENTS

| | | | |
|---|---|---|---|
| 2014/0099559 A1 | 4/2014 | Parans Paranthaman et al. | |
| 2014/0127567 A1 | 5/2014 | Kuriki et al. | |

FOREIGN PATENT DOCUMENTS

| | | | |
|---|---|---|---|
| JP | 2009-004371 A | | 1/2009 |
| JP | 2011-049161 A | | 3/2011 |
| JP | 2012-104290 A | | 5/2012 |
| JP | 2013-69566 | * | 4/2013 |
| JP | 2013-69566 A | | 4/2013 |

OTHER PUBLICATIONS

Office Action for Japanese Patent Application No. 2016-192876 (dated Feb. 14, 2017).
Search Report for European Patent Application No. 17156172.3 (dated Jul. 7, 2017).

* cited by examiner

*Primary Examiner* — Laura Weiner
(74) *Attorney, Agent, or Firm* — Merchant & Gould P.C.

(57) ABSTRACT

A cathode material for a lithium-ion secondary battery of the present invention includes central particles represented by $Li_xA_yM_zPO_4$ and a carbonaceous film that coats surfaces of the central particles, an average value of R values ($I_{1580}/I_{1360}$), which are ratios of a peak intensity ($I_{1580}$) of a spectrum at a frequency band of $1,580\pm50$ cm$^{-1}$ to a peak intensity ($I_{1360}$) of the spectrum at a frequency band of $1,360\pm50$ cm$^{-1}$ in a Raman spectrum analysis, measured at five points is 0.80 or more and 1.10 or less, and a standard deviation of the R values measured at five points is 0.010 or less.

5 Claims, 1 Drawing Sheet

CATHODE MATERIAL FOR LITHIUM-ION SECONDARY BATTERY, CATHODE FOR LITHIUM-ION SECONDARY BATTERY, AND LITHIUM-ION SECONDARY BATTERY

CROSS-REFERENCE TO RELATED APPLICATIONS

This application claims the benefit of Japanese Patent Application No. 2016-192876 filed Sep. 30, 2016, the disclosure of which is herein incorporated by reference in its entirety.

BACKGROUND OF THE INVENTION

Field of the Invention

The present invention relates to a cathode material for a lithium-ion secondary battery, a cathode for a lithium-ion secondary battery, and a lithium-ion secondary battery.

Description of Related Art

In recent years, as batteries anticipated to have a small size and a high capacity and weigh less, non-aqueous electrolytic solution-based secondary batteries such as lithium-ion secondary batteries have been proposed and put into practical use. Lithium-ion secondary batteries are constituted of a cathode and an anode which have properties capable of reversibly intercalating and deintercalating lithium ions, and a non-aqueous electrolyte.

As anode active materials for anode materials of lithium-ion secondary batteries, generally, carbon-based materials or Li-containing metal oxides having properties capable of reversibly intercalating and deintercalating lithium ions are used. Examples of the Li-containing metal oxides include lithium titanate ($Li_4Ti_5O_{12}$).

Meanwhile, as cathodes of lithium-ion secondary batteries, cathode material mixtures including a cathode material, a binder, and the like are used. As the cathode active material, for example, Li-containing metal oxides having properties capable of reversibly intercalating and deintercalating lithium ions such as lithium iron phosphate ($LiFePO_4$) are used. In addition, cathodes of lithium-ion secondary batteries are formed by applying the cathode material mixture onto the surface of a metal foil that is called an electrode current collector.

As electrolytic solutions for lithium-ion secondary batteries, non-aqueous solvents are used. Non-aqueous solvents enable the application of cathode active materials that are oxidized and reduced at a high potential or anode active materials that are oxidized and reduced at a low potential. Therefore, lithium-ion secondary batteries having a higher voltage can be realized.

These lithium-ion secondary batteries have a small size and a higher energy and weigh less than secondary batteries in the related art such as lead batteries, nickel cadmium batteries, and nickel metal hydride batteries. Therefore, lithium-ion secondary batteries are used not only as small-size power supplies used in portable electronic devices such as mobile phones and notebook personal computers but also as large-size stationary emergency power supplies.

In recent years, there has been a demand for the performance improvement of lithium-ion secondary batteries, and a variety of studies have been carried out. For example, in a case in which a lithium-ion secondary battery is used in a high-current density region, there is a demand for additional improvement in electron conductivity in order to improve the performance. Regarding the above-described property demands, techniques for coating the surfaces of cathode active materials with a carbonaceous material (hereinafter, in some cases, referred to as "carbonaceous film") are known (for example, refer to Japanese Laid-open Patent Publication No. 2009-004371, Japanese Laid-open Patent Publication No. 2011-049161, and Japanese Laid-open Patent Publication No. 2012-104290). As a method for coating the surface of a cathode active material with a carbonaceous film, methods in which a cathode active material and a carbon source are mixed together and this mixture is calcinated in an inert atmosphere or a reducing atmosphere are known.

SUMMARY OF THE INVENTION

In a case in which a lithium-ion secondary battery is used in a high-current density region, reaction unevenness regarding the intercalation and deintercalation of lithium ions in the cathode in-plane direction and the thickness direction is caused in the cathode of the lithium-ion secondary battery, and thus it becomes difficult to obtain a necessary current value in the final stage of charge and discharge, and there is a problem of input and output characteristics such as an increase in overvoltage. In addition, in lithium-ion secondary batteries in which a polyanion-based cathode material (for example, lithium iron phosphate or lithium manganese phosphate) obtained by coating the surface of a cathode active material with a carbonaceous film is employed as a cathode material as well, there is the same problem.

In addition, in the related art, there are no methods for easily detecting reaction unevenness in the cathodes of the lithium-ion secondary battery, and it is difficult to efficiently reduce reaction unevenness in the cathode.

The present invention has been made in consideration of the above-described circumstances, and an object of the present invention is to provide a cathode material for a lithium-ion secondary battery which reduces reaction unevenness in the cathode of the lithium-ion secondary battery and has excellent input and output characteristics, a cathode for a lithium-ion secondary battery including the cathode material for a lithium-ion secondary battery, and a lithium-ion secondary battery including the cathode for a lithium-ion secondary battery.

The present inventors and the like carried out intensive studies in order to achieve the above-described object, consequently found that, when a cathode material for a lithium-ion secondary battery including central particles represented by $Li_xA_yM_zPO_4$ ($0 \leq x \leq 1.1$, $0.8 \leq y \leq 1.1$, and $0 \leq z \leq 0.2$; here, A represents at least one element selected from the group consisting of Fe, Mn, Co, and Ni, and M represents at least one element selected from the group consisting of Mg, Ca, Co, Sr, Ba, Ti, Zn, B, Al, Ga, In, Si, Ge, and rare earth elements) and a carbonaceous film that coats surfaces of the central particles, in which the average value of R values ($I_{1580}/I_{1360}$), which are ratios of a peak intensity ($I_{1580}$) of a spectrum at a frequency band of $1,580 \pm 50$ $cm^{-1}$ to a peak intensity ($I_{1360}$) of the spectrum at a frequency band of $1,360 \pm 50$ $cm^{-1}$ in a Raman spectrum analysis, measured at five points is 0.80 or more and 1.10 or less, and the standard deviation of the R values measured at five points is 0.010 or less is used as a cathode of a lithium-ion secondary battery, reaction unevenness in the cathode of the lithium-ion secondary battery is reduced, and a lithium-ion secondary battery having excellent input and output characteristics can be obtained, and completed the present invention.

A cathode material for a lithium-ion secondary battery of the present invention includes central particles represented by $Li_xA_yM_zPO_4$ ($0 \leq x \leq 1.1$, $0.8 \leq y \leq 1.1$, and $0 \leq z \leq 0.2$; here, A represents at least one element selected from the group consisting of Fe, Mn, Co, and Ni, and M represents at least one element selected from the group consisting of Mg, Ca, Co, Sr, Ba, Ti, Zn, B, Al, Ga, In, Si, Ge, and rare earth elements); and a carbonaceous film that coats surfaces of the central particles, in which an average value of R values ($I_{1580}/I_{1360}$), which are ratios of a peak intensity ($I_{1580}$) of a spectrum at a frequency band of $1,580 \pm 50$ cm$^{-1}$ to a peak intensity ($I_{1360}$) of the spectrum at a frequency band of $1,360 \pm 50$ cm$^{-1}$ in a Raman spectrum analysis, measured at five points is 0.80 or more and 1.10 or less, and a standard deviation of the R values measured at five points is 0.010 or less.

A cathode for a lithium-ion secondary battery of the present invention is a cathode material for a lithium-ion secondary battery including an electrode current collector and a cathode mixture layer formed on the electrode current collector, in which the cathode mixture layer includes the cathode material for a lithium-ion secondary battery of the present invention.

A lithium-ion secondary battery of the present invention includes the cathode for a lithium-ion secondary battery of the present invention.

According to the cathode material for a lithium-ion secondary battery of the present invention, it is possible to provide a cathode material for a lithium-ion secondary battery with which lithium-ion secondary batteries having excellent input and output characteristics when being used as a cathode in lithium-ion secondary batteries can be obtained.

According to the cathode for a lithium-ion secondary battery of the present invention, since the cathode material for a lithium-ion secondary battery of the present invention is included, reaction unevenness in the cathode is reduced, the elution of transition metal is significantly suppressed, and lithium-ion secondary batteries for which the cathode for a lithium-ion secondary battery of the present invention is used are excellent in terms of the stability and safety of long-term cycles.

According to the lithium-ion secondary battery of the present invention, since the cathode for a lithium-ion secondary battery of the present invention is included as the cathode, reaction unevenness in the cathode is reduced, the oxidation decomposition of electrolytic solutions and the generation of gas are suppressed, and the stability and safety of long-term cycles are excellent.

DETAILED DESCRIPTION OF THE INVENTION

Embodiments of a cathode material for a lithium-ion secondary battery, a cathode for a lithium-ion secondary battery, and a lithium-ion secondary battery of the present invention will be described.

Meanwhile, the present embodiment is specific description for better understanding of the gist of the invention and does not limit the present invention unless particularly otherwise described.

Cathode Material for Lithium-Ion Secondary Battery

A cathode material for a lithium-ion secondary battery of the present embodiment includes central particles represented by $Li_xA_yM_zPO_4$ ($0 \leq x \leq 1.1$, $0.8 \leq y \leq 1.1$, and $0 \leq z \leq 0.2$; here, A represents at least one element selected from the group consisting of Fe, Mn, Co, and Ni, and M represents at least one element selected from the group consisting of Mg, Ca, Co, Sr, Ba, Ti, Zn, B, Al, Ga, In, Si, Ge, and rare earth elements) and a carbonaceous film that coats surfaces of the central particles, and the average value of R values ($I_{1580}/I_{1360}$), which are the ratios of a peak intensity ($I_{1580}$) of a spectrum at a frequency band of $1,580 \pm 50$ cm$^{-1}$ to a peak intensity ($I_{1360}$) of the spectrum at a frequency band of $1,360 \pm 50$ cm$^{-1}$ in a Raman spectrum analysis, measured at five points is 0.80 or more and 1.10 or less, and the standard deviation of the R values measured at five points is 0.010 or less.

In the cathode material for a lithium-ion secondary battery of the present embodiment, since the average value of the R values ($I_{1580}/I_{1360}$), which are the ratios of the peak intensity ($I_{1580}$) of the spectrum at a frequency band of $1,580 \pm 50$ cm$^{-1}$ to the peak intensity ($I_{1360}$) of the spectrum at a frequency band of $1,360 \pm 50$ cm$^{-1}$ in the Raman spectrum analysis, measured at five points is 0.80 or more and 1.10 or less, and the standard deviation of the R values measured at five points is 0.010 or less, the degree of carbonization of the carbonaceous film that coats the surfaces of the central particles is uniform, and thus the electron conductivity of the cathode material becomes uniform, and, when the cathode material is used for cathodes in lithium-ion secondary batteries, it is possible to reduce reaction unevenness in the cathodes.

In addition, in the cathode material for a lithium-ion secondary battery of the present embodiment, the average value of the R values ($I_{1580}/I_{1360}$), which are the ratios of the peak intensity ($I_{1580}$) of the spectrum at a frequency band of $1,580 \pm 50$ cm$^{-1}$ to the peak intensity ($I_{1360}$) of the spectrum at a frequency band of $1,360 \pm 50$ cm$^{-1}$ in the Raman spectrum analysis, measured at five points is 0.83 or more and 0.97 or less, the standard deviation of the R values measured at five points is 0.010 or less, the average primary particle diameter is 50 nm or more and 300 nm or less, the amount of carbon forming the carbonaceous film is 0.6 parts by mass or more and 3 parts by mass or less with respect to 100 parts by mass of the central particles, the cathode material is used for cathodes of lithium-ion secondary batteries in which natural graphite is used for the anode, and, the depth of discharge of the discharge capacity of the lithium-ion secondary battery which is, in an environment of 25° C., constant-current-charged at a current value of 0.1 C until the battery voltage reaches 3.7 V and is then constant-current-discharged at a current value of 5 C until the battery voltage reaches 2.5 V is considered as 100%, when the battery voltage of the lithium-ion secondary battery which is constant-current-charged and is then constant-current-discharged at a current value of 0.1 C until the depth of discharge reaches 90% is indicated by D1, and the battery voltage of the lithium-ion secondary battery which is constant-current-charged and is then constant-current-discharged at a current value of 5 C until the depth of discharge reaches 90% is indicated by D2, (D1−D2) is preferably 0.45 V or less and more preferably 0.3 V or less.

The cathode material for a lithium-ion secondary battery of the present embodiment is used for cathodes of lithium-ion secondary batteries in which natural graphite is used for the anode, and, in the lithium-ion secondary battery including these cathode and anode, when (D1−D2) which reflects the degree of reaction unevenness in the battery is 0.45V or less, it is possible to sufficiently suppress reaction unevenness in the cathode of the lithium-ion secondary battery to a small extent, it becomes possible to uniformly progress reactions, and it is possible to obtain lithium-ion secondary batteries in which the input and output characteristics are excellent and the voltage drop is small in the final stage of charge and discharge. Meanwhile, when the fraction of a resistance attributed to the cathode in the resistance of the entire lithium-ion secondary battery of the present embodiment is taken into account, it is considered that, when (D1−D2) reaches a low value of 0.15 V, it is possible to reduce reaction unevenness in the cathode to the maximum extent.

Cathode Material Particles

Cathode material particles (the particles of the cathode material for a lithium-ion secondary battery) include central particles represented by $Li_xA_yM_zPO_4$ (0≤x≤1.1, 0.8≤y≤1.1, and 0≤z≤0.2; here, A represents at least one element selected from the group consisting of Fe, Mn, Co, and Ni, and M represents at least one element selected from the group consisting of Mg, Ca, Co, Sr, Ba, Ti, Zn, B, Al, Ga, In, Si, Ge, and rare earth elements) and a carbonaceous film that coats surfaces of the central particles.

The central particles are preferably represented by $Li_xFe_{1-z}M_zPO_4$ (0≤x≤1.1, and 0≤z≤0.2; here, M represents at least one element selected from the group consisting of Mg, Ca, Co, Sr, Ba, Ti, Zn, B, Al, Ga, In, Si, Ge, and rare earth elements).

The average primary particle diameter of the cathode material particles is preferably 10 nm or more and 700 nm or less and more preferably 20 nm or more and 500 nm or less.

When the average primary particle diameter of the cathode material particles is 10 nm or more, the specific surface area of the cathode material particles increases, and thus an increase in the mass of carbon that becomes necessary is suppressed, and it is possible to suppress a decrease in the charge and discharge capacity of lithium-ion secondary batteries. On the other hand, when the average primary particle diameter of the cathode material particles is 700 μm or less, it is possible to suppress the time taken for the migration of lithium ions or the migration of electrons among the cathode material particles being extended. Therefore, it is possible to suppress the deterioration of the output characteristics due to an increase in the internal resistance of lithium-ion secondary batteries.

Here, the average primary particle diameter refers to the volume-average primary particle diameter. The average primary particle diameter of the primary particles of the central particles can be measured using a laser diffraction and scattering particle size distribution measurement instrument or the like. In addition, it is also possible to arbitrarily select a plurality of primary particles observed using a scanning electron microscope (SEM) and compute the average primary particle diameter of the primary particles.

The amount of carbon in the cathode material particles is preferably 0.1% by mass or more and 10% by mass or less and more preferably 0.3% by mass or more and 3% by mass or less.

When the amount of carbon is 0.1% by mass or more, the discharge capacity of lithium-ion secondary batteries at a high charge-discharge rate increases, and it is possible to realize sufficient charge and discharge rate performance. On the other hand, when the amount of carbon is 10% by mass or less, it is possible to suppress the battery capacity of lithium-ion secondary batteries per unit mass of the cathode material particles being decreased more than necessary.

The carbon supporting amount with respect to the specific surface area of the primary particles of the central particles constituting the cathode material particles ("[the carbon supporting amount]/[the specific surface area of the primary particles of the central particles]"; hereinafter, referred to as "the carbon supporting amount ratio") is preferably 0.01 $g/m^2$ or more and 0.5 $g/m^2$ or less and more preferably 0.03 $g/m^2$ or more and 0.3 $g/m^2$ or less.

When the carbon supporting amount ratio is 0.01 $g/m^2$ or more, the discharge capacity of lithium-ion secondary batteries at a high charge-discharge rate increases, and it is possible to realize sufficient charge and discharge rate performance. On the other hand, when the carbon supporting amount ratio is 0.5 $g/m^2$ or less, it is possible to suppress the battery capacity of lithium-ion secondary batteries per unit mass of the cathode material particles being decreased more than necessary.

The specific surface area of the cathode material particles is preferably 5 $m^2/g$ or more and more preferably 7 $m^2/g$ or more.

When the specific surface area of the cathode material particles A is 5 $m^2/g$ or more, the coarsening of the cathode material particles is suppressed, and thus it is possible to increase the diffusion rate of lithium among the particles. Therefore, it is possible to improve the battery characteristics of lithium-ion secondary batteries.

In addition, the upper limit value of the specific surface area of the cathode material particles is not particularly limited as long as a desired effect can be obtained and may be 50 $m^2/g$ or less and may be 20 $m^2/g$ or less.

Central Particles

The central particles constituting the cathode material for a lithium-ion secondary battery of the present embodiment are made of a cathode active material represented by $Li_xA_yM_zPO_4$ (0≤x≤1.1, 0.8≤y≤1.1, and 0≤z≤0.2; here, A represents at least one element selected from the group consisting of Fe, Mn, Co, and Ni, and M represents at least one element selected from the group consisting of Mg, Ca, Co, Sr, Ba, Ti, Zn, B, Al, Ga, In, Si, Ge, and rare earth elements).

Meanwhile, the rare earth elements refer to 15 elements of La, Ce, Pr, Nd, Pm, Sm, Eu, Gd, Tb, Dy, Ho, Er, Tm, Yb, and Lu which belong to the lanthanum series.

The average primary particle diameter of the primary particles of the central particles constituting the cathode material particles for a lithium-ion secondary battery of the present embodiment is preferably 5 nm or more and 800 nm or less and more preferably 20 nm or more and 500 nm or less.

When the average primary particle diameter of the primary particles of the central particles is 5 nm or more, it is possible to sufficiently coat the surfaces of the primary particles of the central particles with the carbonaceous film. In addition, it is possible to increase the discharge capacity of lithium-ion secondary batteries during high-speed charge and discharge and realize sufficient charge and discharge performance. On the other hand, when the average primary particle diameter of the primary particles of the central particles is 800 nm or less, it is possible to decrease the internal resistance of the primary particles of the central particles. In addition, it is possible to increase the discharge capacity of lithium-ion secondary batteries during high-speed charge and discharge.

The shape of the primary particles of the central particles is not particularly limited, but is preferably a spherical shape since it is easy to generate the cathode active material made of spherical, particularly, truly spherical secondary particles.

When the shape of the primary particles of the central particles is a spherical shape, it is possible to decrease the amount of a solvent when cathode material paste is prepared by mixing the cathode material for a lithium-ion secondary battery, a binder resin (binding agent), and a solvent. Furthermore, when the shape of the primary particles of the central particles is a spherical shape, it becomes easy to apply the cathode material paste to electrode current collectors. Furthermore, when the shape of the primary particles of the central particles is a spherical shape, the surface area of the primary particles of the central particles is minimized, and thus it is possible to minimize the amount of the binder resin (binding agent) blended into the cathode material paste. As a result, it is possible to decrease the internal resistance of cathodes for which the cathode material for a lithium-ion secondary battery of the present embodiment is used. In addition, when the shape of the primary particles of the central particles is a spherical shape, it becomes easy to closely pack the cathode material, and thus the amount of the cathode material for a lithium-ion secondary battery packed per unit volume of the cathode increases. As a result, it is possible to increase the cathode density, and high-capacity lithium-ion secondary batteries can be obtained.

Carbonaceous Film

The carbonaceous film coats the surfaces of the central particles.

When the surfaces of the central particles are coated with the carbonaceous film, it is possible to improve the electron conductivity of the cathode material for a lithium-ion secondary battery.

The thickness of the carbonaceous film is preferably 0.2 nm or more and 10 nm or less and more preferably 0.5 nm or more and 4 nm or less.

When the thickness of the carbonaceous film is 0.2 nm or more, it is possible to prevent the excessively thin thickness of the carbonaceous film from disabling the formation of films having a desired resistance value. In addition, it is possible to ensure conductive properties suitable for the cathode material for a lithium-ion secondary battery. On the other hand, when the thickness of the carbonaceous film is 10 nm or less, it is possible to suppress a decrease in the battery capacity per unit mass of the cathode material for a lithium-ion secondary battery.

In addition, when the thickness of the carbonaceous film is 0.2 nm or more and 10 nm or less, it becomes easy to closely pack the cathode material for a lithium-ion secondary battery, and thus the amount of the cathode material for a lithium-ion secondary battery packed per unit volume of the cathode increases. As a result, it is possible to increase the cathode density, and high-capacity lithium-ion secondary batteries can be obtained.

The coating ratio of the carbonaceous film with respect to the central particles is preferably 60% or more and 95% or less and more preferably 80% or more and 95% or less. When the coating ratio of the carbonaceous film is 60% or more, the coating effect of the carbonaceous film can be sufficiently obtained.

In the Raman spectrum analysis of the cathode material for a lithium-ion secondary battery having the carbonaceous film on the surfaces of the central particles in the present embodiment, the average value of the R values ($I_{1580}/I_{1360}$), which are the ratios of a peak intensity ($I_{1580}$) of a spectrum at a frequency band of $1{,}580 \pm 50$ cm$^{-1}$ to a peak intensity ($I_{1360}$) of the spectrum at a frequency band of $1{,}360 \pm 50$ cm$^{-1}$, measured at five points is 0.8 or more and 1.10 or less, preferably 0.83 or more and 1.03 or less, and more preferably 0.83 or more and 0.97 or less.

Here, in the peak having the center at 1,580 cm$^{-1}$ which is measured in the Raman spectroscopy spectrum, a peak indicating a state of the hexagonal net surfaces of graphite being regularly stacked and a peak derived from an organic semiconductor are superimposed together. Since the intensity of the peak derived from an organic semiconductor decreases as carbonization progresses, the intensity of the peak having the center at 1,580 cm$^{-1}$ decreases as carbonization progresses. Meanwhile, the peak having the center at 1,360 cm$^{-1}$ indicates the collapse of the stacking of the hexagonal net surfaces of graphite.

Therefore, when the five-point average value of the R values is 0.80 or more, the stacking of the hexagonal net surfaces of graphite is appropriately disarrayed in the carbonaceous film, and thus lithium is likely to easily migrate in the carbonaceous film. On the other hand, when the five-point average value of the R values is 1.10 or less, the degree of carbonization in the carbonaceous film sufficiently progresses, and thus it is possible to carry necessary electron conductivity as the cathode material for a lithium-ion secondary battery.

The standard deviation of the R values measured at five points is 0.010 or less. In a case in which the cathode material for a lithium-ion secondary battery of the present embodiment is used in lithium ion secondary batteries, the unevenness in the degree of carbonization of the cathode material for a lithium-ion secondary battery is small, and thus it is possible to reduce reaction unevenness in the cathode and obtain lithium-ion secondary batteries having excellent input and output characteristics.

According to the cathode material for a lithium-ion secondary battery of the present embodiment, the degree of the carbonization of the carbonaceous film that coats the surfaces of the central particles (cathode active material particles) represented by $Li_xA_yM_zPO_4$ ($0 \leq x \leq 1.1$, $0.8 \leq y \leq 1.1$, and $0 \leq z \leq 0.2$; here, A represents at least one element selected from the group consisting of Fe, Mn, Co, and Ni, and M represents at least one element selected from the group consisting of Mg, Ca, Co, Sr, Ba, Ti, Zn, B, Al, Ga, In, Si, Ge, and rare earth elements) is uniformed, and thus, in a case in which a cathode including this cathode material for a lithium-ion secondary battery is applied to a lithium-ion secondary battery, it is possible to realize lithium-ion secondary batteries in which reaction unevenness in the cathode is reduced, the input and output characteristics are excellent, and the voltage drop in the final stage of charge and discharge is small.

Method for Manufacturing Cathode Material for Lithium-Ion Secondary Battery

A method for manufacturing a cathode material for a lithium-ion secondary battery of the present embodiment (hereinafter, in some cases, simply referred to as the method for manufacturing a cathode material) is a method for manufacturing a cathode material for a lithium-ion secondary battery including central particles made of a cathode active material represented by $Li_xA_yM_zPO_4$ ($0 \leq x \leq 1.1$, $0.8 \leq y \leq 1.1$, and $0 \leq z \leq 0.2$; here, A represents at least one element selected from the group consisting of Fe, Mn, Co, and Ni, and M represents at least one element selected from the group consisting of Mg, Ca, Co, Sr, Ba, Ti, Zn, B, Al, Ga, In, Si, Ge, and rare earth elements) and includes a step (A) of obtaining a precursor of the cathode active material by dispersing at least a lithium salt, a metal salt including Fe, and a phosphoric acid compound out of lithium salts, metal salts including Fe, metal salts including Mn, compounds including M, and phosphoric acid compounds in a dispersion medium so as to prepare a dispersion liquid and heating the dispersion liquid in a pressure resistant vessel, a step (B) of preparing a mixture by adding an organic compound which serves as a carbonaceous film source to the precursor of the cathode active material, and a step (C) of putting the mixture into a calcination capsule and calcinating the mixture. The step (B) of preparing the mixture is a step of preparing a mixture by further adding a thermal conduction auxiliary substance having a higher heat transfer rate than the precursor of the cathode active material. Alternatively, the step (C) of calcinating the mixture is a step of adding a thermal conduction auxiliary substance having a higher heat transfer rate than the precursor of the cathode active material to the mixture and then calcinating the mixture.

Step (A)

In the step (A) in the method for manufacturing a cathode material of the present embodiment, out of lithium salts, metal salts including Fe, metal salts including Mn, compounds including M, and phosphoric acid compounds, at least a lithium salt, a metal salt including Fe, and a phosphoric acid compound are dispersed in a dispersion medium so as to prepare a dispersion liquid, and the dispersion liquid is heated in a pressure resistant vessel, thereby obtaining a precursor of the cathode active material.

In a molar ratio described below, a lithium salt, a metal salt including Fe, a metal salt including Mn, a compound including M, and a phosphoric acid compound are blended together. Meanwhile, the lithium salt, the metal salt including Fe, and the phosphoric acid compound are essential raw materials, and the metal salt including Mn and the compound including M are raw materials that are added as desired. In addition, M is at least one element selected from the group consisting of Mg, Ca, Co, Sr, Ba, Ti, Zn, B, Al, Ga, In, Si, Ge, and rare earth elements.

The molar ratio (Li:Fe:Mn:M:P) of the lithium salt in terms of an Li element, the metal salt including Fe in terms of a Fe element, the metal salt including Mn in terms of an Mn element, the compound including M in terms of an M element, and the phosphoric acid compound in terms of a phosphoric element is preferably 1 or more and 4 or less:0 or more and 1.5 or less:0 or more and 1.5 or less:0 or more and 0.2 or less:1, and more preferably 2.5 or more and 3.5 or less:0 or more and 1.1 or less:0 or more and 1.1 or less:0 or more and 0.1 or less:1.

For example, the lithium salt, the metal salt including Fe, the metal salt including Mn, the compound including M, and the phosphoric acid compound are injected into a solvent including water as a main component and are stirred and mixed together, thereby preparing a dispersion liquid.

When the uniform mixing of these raw materials is taken into account, it is preferable to prepare aqueous solutions of the respective raw materials and mix the aqueous solutions together, thereby preparing a dispersion liquid.

Since it is necessary to obtain central particles that are highly pure, highly crystalline, and extremely fine, the mole concentration of the raw materials in the dispersion liquid is preferably 1.1 mol/L or more and 2.2 mol/L or less.

As the lithium salt that is used for the preparation of the dispersion liquid, for example, at least one salt selected from the group consisting of hydroxides such as lithium hydroxide (LiOH); inorganic lithium acid salts such as lithium carbonate ($Li_2CO_3$), lithium chloride (LiCl), lithium nitrate ($LiNO_3$), lithiumphosphate ($Li_3PO_4$), lithium hydrogen phosphate ($Li_2HPO_4$), and lithium dihydrogen phosphate ($LiH_2PO_4$); organic lithium acid salts such as lithium acetate ($LiCH_3COO$) and lithium oxalate (($COOLi)_2$); and hydrates thereof is preferably used.

Meanwhile, lithium phosphate ($Li_3PO_4$) can also be used as the phosphoric acid compound for the preparation of the dispersion liquid.

As the metal salt including Fe that is used for the preparation of the dispersion liquid, for example, at least one salt selected from the group consisting of iron compounds such as iron (II) chloride ($FeCl_2$), iron (II) sulfate ($FeSO_4$), and iron (II) acetate ($Fe(CH_3COO)_2$) or hydrates thereof; trivalent iron compounds such as iron (III) nitrate ($Fe(NO_3)_3$), iron (III) chloride ($FeCl_3$), and iron (III) citrate ($FeC_6H_5O_7$); and lithium iron phosphate is preferably used.

As the metal salt including Mn that is used for the preparation of the dispersion liquid, an Mn salt is preferred, and, for example, at least one salt selected from the group consisting of manganese (II) chloride ($MnCl_2$), manganese (II) sulfate ($MnSO_4$), manganese (II) nitrate ($Mn(NO_3)_2$), manganese (II) acetate ($Mn(CH_3COO)_2$), and hydrates thereof is preferably used.

As the compound including M that is used for the preparation of the dispersion liquid, at least one raw material substance selected from the group consisting of Mg, Ca, Co, Sr, Ba, Ti, Zn, B, Al, Ga, In, Si, Ge, and rare earth elements is preferably used.

As the raw material substance of Mg, for example, at least one raw material substance selected from the group consisting of magnesium (II) chloride ($MgCl_2$), magnesium (II) sulfate ($MgSO_4$) magnesium (II) nitrate ($Mg(NO_3)_2$), magnesium (II) acetate ($Mg(CH_3COO)_2$), and hydrates thereof is preferably used.

As the raw material substance of Ca, for example, at least one raw material substance selected from the group consisting of calcium (II) chloride ($CaCl_2$), calcium (II) sulfate ($CaSO_4$) calcium (II) nitrate ($Ca(NO_3)_2$), calcium (II) acetate ($Ca(CH_3COO)_2$), and hydrates thereof is preferably used.

As the raw material substance of Co, a Co salt is preferred, and, for example, at least one raw material substance selected from the group consisting of cobalt (II) chloride ($CoCl_2$), cobalt (II) sulfate ($CoSO_4$), cobalt (II) nitrate ($Co(NO_3)_2$), cobalt (II) acetate ($Co(CH_3COO)_2$), and hydrates thereof is preferably used.

As the raw material substance of Sr, for example, at least one raw material substance selected from the group consisting of strontium carbonate ($SrCO_3$), strontium sulfate ($SrSO_4$), and strontium hydroxide ($Sr(OH)_2$) is preferably used.

As the raw material substance of Ba, for example, at least one raw material substance selected from the group consisting of barium (II) chloride ($BaCl_2$), barium (II) sulfate ($BaSO_4$), barium (II) nitrate ($Ba(NO_3)_2$), barium (II) acetate ($Ba(CH_3COO)_2$) r, and hydrates thereof is preferably used.

As the raw material substance of Ti, for example, at least one raw material substance selected from the group consisting of titanium chlorides ($TiCl_4$, $TiCl_3$, and $TiCl_2$), titanium oxide (TiO), and hydrates thereof is preferably used.

As the raw material substance of Zn, a Zn salt is preferred, and, for example, at least one raw material substance selected from the group consisting of zinc (II) chloride ($ZnCl_2$), zinc (II) sulfate ($ZnSO_4$), zinc (II) nitrate ($Zn(NO_3)_2$), zinc (II) acetate ($Zn(CH_3COO)_2$), and hydrates thereof is preferably used.

As the raw material substance of B, for example, at least one raw material substance selected from the group consisting of boron compounds such as chlorides of boron, sulfoxides of boron, nitroxides of boron, acetoxides of boron, hydroxides of boron, and oxides of boron is preferably used.

As the raw material substance of Al, for example, at least one raw material substance selected from the group consisting of aluminum compounds such as aluminum chloride, aluminum sulfate, aluminum nitrate, aluminum acetate, and aluminum hydroxide is preferably used.

As the raw material substance of Ga, for example, at least one raw material substance selected from the group consisting of gallium compounds such as gallium chloride, gallium sulfate, gallium nitrate, gallium acetate, and gallium hydroxide is preferably used.

As the raw material substance of In, for example, at least one raw material substance selected from the group consisting of indium compounds such as indium chloride, indium sulfate, indium nitrate, indium acetate, and indium hydroxide is preferably used.

As the raw material substance of Si, for example, at least one raw material substance selected from the group consisting of silicates such as sodium silicate and potassium silicate, silicon tetrachloride ($SiCl_4$), and organic silicon compounds is preferably used.

As the raw material substance of Ge, for example, at least one raw material substance selected from the group consisting of germanium compounds such as germanium chloride, germanium sulfate, germanium nitrate, germanium acetate, germanium hydroxide, and germanium oxide is preferably used.

As the raw material substance of the rare earth elements, for example, at least one raw material substance selected from the group consisting of chlorides, sulfoxides, nitroxides, acetoxides, hydroxides, and oxides of Sc, Y, La, Ce, Pr, Nd, Pm, Sm, Eu, Gd, Tb, Dy, Ho, Er, Tm, Yb, and Lu is preferably used.

As the phosphoric acid compound that is used for the preparation of the dispersion liquid, for example, at least one salt selected from the group consisting of phosphoric acids such as orthophosphonic acid ($H_3PO_4$) and metaphosphoric acid ($HPO_3$); phosphoric salts such as ammoniumdihydrogenphosphate ($NH_4H_2PO_4$), diammonium hydrogen phosphate (($NH_4)_2HPO_4$), ammonium hydrogen phosphate (($NH_4)_3PO_4$), lithium phosphate ($Li_3PO_4$), lithium hydrogen phosphate ($Li_2HPO_4$), and lithium dihydrogen phosphate ($LiH_2PO_4$); and hydrates thereof is preferably used.

The solvent including water as a main component is any one of water alone and water-based solvents which include water as a main component and include an aqueous solvent such as an alcohol as necessary.

The aqueous solvent is not particularly limited as long as the solvent is capable of dissolving the lithium salt, the metal salt including Fe, the metal salt including Mn, the metal salt including M, and the phosphoric acid compounds. Examples thereof include alcohols such as methanol, ethanol, 1-propanol, 2-propanol (isopropylalcohol: IPA), butanol, pentanol, hexanol, octanol, and diacetone alcohol, esters such as ethyl acetate, butyl acetate, ethyl lactate, propylene glycol monomethyl ether acetate, propylene glycol monoethyl ether acetate, and γ-butyrolactone, ethers such as diethyl ether, ethylene glycol monomethyl ether (methyl cellosolve), ethylene glycol monoethyl ether (ethyl cellosolve), ethylene glycolmonobutyl ether (butyl cellosolve), diethylene glycol monomethyl ether, and diethylene glycol monoethyl ether, ketones such as acetone, methyl ethyl ketone (MEK), methyl isobutyl ketone (MIBK), acetyl acetone, and cyclohexanone, amides such as dimethyl formamide, N,N-dimethylacetoacetamide, and N-methyl pyrrolidone, glycols such as ethylene glycol, diethylene glycol, and propylene glycol, and the like. These aqueous solvents may be used singly or two or more aqueous solvents may be used in a mixture form.

A method for dispersing the above-described raw materials in the solvent is not particularly limited as long as the raw materials are uniformly dispersed in the solvent.

As a device for dispersing the raw materials in the solvent, for example, a medium stirring-type dispersion device that stirs medium particles at a high rate such as a planetary ball mill, an oscillation ball mill, a bead mill, a paint shaker, and an attritor is preferably used.

Next, the prepared dispersion liquid is put into a pressure resistant vessel, is heated to a predetermined temperature, and is reacted for a predetermined time (hydrothermal reaction).

The reaction conditions are appropriately selected depending on the kind of the solvent or substances to be synthesized. For example, in a case in which water is used as the solvent, the heating temperature is preferably 80° C. or higher and 374° C. or lower and more preferably 100° C. or higher and 350° C. or lower. In addition, the reaction time is preferably 30 minutes or longer and 24 hours or shorter and more preferably 30 minutes or longer and 5 hours or shorter. Furthermore, the pressure during the reaction is preferably 0.1 MPa or more and 22 MPa or less and more preferably 0.1 MPa or more and 17 MPa or less.

After that, for example, the reaction product obtained by lowering the temperature is cleaned with water, whereby a precursor of a cathode active material is obtained.

Step (B)

In the step (B) of the method for manufacturing a cathode material of the present embodiment, an organic compound which serves as a carbonaceous film source is added to the precursor of the cathode active material, thereby preparing a mixture.

The amount of the organic compound blended into the precursor of the cathode active material is preferably 0.15 parts by mass or more and 15 parts by mass or less and more preferably 0.45 parts by mass or more and 4.5 parts by mass or less with respect to 100 parts by mass of the precursor when the total mass of the organic compound is converted in terms of the carbon element.

When the amount of the organic compound blended into the precursor is 0.15 parts by mass or more, it is possible to set the coating ratio of the surfaces of the central particles with the carbonaceous film which is generated by a thermal treatment of the organic compound to 80% or more. Therefore, it is possible to increase the discharge capacity at a high charge-discharge rate of the lithium-ion secondary battery, and it is possible to realize sufficient charge and discharge rate performance. On the other hand, when the amount of the organic compound blended into the precursor is 15 parts by mass or less, the blending ratio of the active material is relatively decreased, and it is possible to suppress the capacity of the lithium-ion secondary battery being decreased. In addition, when the amount of the organic compound blended into the precursor is 15 parts by mass or less, it is possible to suppress the bulk density of the cathode material for a lithium-ion secondary battery being increased due to the carbonaceous film excessively carried by the central particles. Meanwhile, when the bulk density of the cathode material for a lithium-ion secondary battery increases, the electrode density decreases, and the battery capacity of the lithium-ion secondary battery per unit volume decreases.

As the organic compound that is used for the preparation of the mixture, for example, at least one organic compound selected from the group consisting of polyvinyl alcohol, polyvinyl pyrrolidone, cellulose, starch, gelatin, carboxymethyl cellulose, methyl cellulose, hydroxymethyl cellulose, hydroxyethyl cellulose, polyacrylic acid, polystyrene sulfonate, polyacrylamide, polyvinylacetate, glucose, fructose, galactose, mannose, maltose, sucrose, lactose, glycogen, pectin, alginic acid, glucomannan, chitin, hyaluronic acid, chondroitin, agarose, polyethers, polyhydric alcohols, and the like is preferably used.

Examples of the polyhydric alcohols include polyethylene glycol, polypropylene glycol, polyglycerin, glycerin, and the like.

For example, a slurry may be prepared by injecting the precursor of the cathode active material and the organic compound which serves as the carbonaceous film source into the solvent and dispersing the precursor and the organic compound in the solvent. In addition, a mixture may be obtained by drying the slurry.

Examples of the solvent include water; alcohols such as methanol, ethanol, 1-propanol, 2-propanol (isopropyl alcohol: IPA), butanol, pentanol, hexanol, octanol, and diacetone alcohol, esters such as ethyl acetate, butyl acetate, ethyl lactate, propylene glycol monomethyl ether acetate, propylene glycol monoethyl ether acetate, and γ-butyrolactone; ethers such as diethyl ether, ethylene glycol monomethyl ether (methyl cellosolve), ethylene glycol monoethylether (ethyl cellosolve), ethylene glycol monobutyl ether (butyl cellosolve), diethylene glycol monomethyl ether, and diehtylene glycol monoethyl ether; ketones such as acetone, methyl ethyl ketone (MEK), methyl isobutyl ketone (MIBK), acetylacetone, and cyclohexanone; amides such as dimethyl formamide, N,N-dimethylacetoacetamide, and N-methylpyrrolidone; glycols such as ethylene glycol, diethylene glycol, and propylene glycol, and the like. These solvents may be used singly, or a mixture of two or more solvents may be used. Among these solvents, a preferred solvent is water.

When the slurry is prepared, a dispersant may be added as necessary.

The method for dispersing the precursor and the organic compound in the solvent is not particularly limited as long as the precursor is uniformly dispersed and the organic compound is dissolved or dispersed. Examples of a device used for the above-described dispersion include medium stirring-type dispersion devices that stir medium particles at a high rate such as a planetary ball mill, an oscillation ball mill, a bead mill, a paint shaker, and an attritor.

A granulated body of the mixture may be generated by spraying and drying the slurry in a high-temperature atmosphere, for example, in the atmosphere of 110° C. or higher and 200° C. or lower using a spraying and thermal decomposition method.

In this spraying and thermal decomposition method, in order to generate a granulated body having a substantially spherical shape by rapidly drying the slurry, the particle diameters of liquid droplets during spraying is preferably 0.01 μm or more and 100 μm or less.

Step (C)

In the step (C) in the method for manufacturing a cathode material of the present embodiment, the mixture is put into a calcination capsule and is calcinated.

As the calcination capsule, for example, a calcination capsule made of a substance having excellent thermal conductivity such as carbon is preferably used.

The calcination temperature is preferably 630° C. or higher and 790° C. or lower and more preferably 680° C. or higher and 770° C. or lower.

When the calcination temperature is 630° C. or higher, the decomposition and reaction of the organic compound sufficiently progresses, the organic compound is sufficiently carbonized, and the generation of high-resistance organic decomposed substances can be suppressed. On the other hand, when the calcination temperature is 790° C. or lower, the reduction of part of the mixture due to carbon and the consequent generation of low-valence iron-based impurities such as pure iron, iron oxides, and iron phosphides can be suppressed.

The calcination time is not particularly limited as long as the organic compound is sufficiently carbonized and is, for example, 0.01 hours or longer and 20 hours or shorter.

The calcination atmosphere is preferably an inert atmosphere filled with an inert gas such as nitrogen ($N_2$) or argon (Ar) or a reducing atmosphere including a reducing gas such as hydrogen ($H_2$). In a case in which it is necessary to further suppress the oxidation of the mixture, the calcination atmosphere is more preferably a reducing atmosphere.

Due to the calcination in the step (C), the precursor of the cathode active material in the mixture turns into the central particles of the cathode material for a lithium-ion secondary battery. On the other hand, the organic compound is decomposed and reacted due to the calcination, and thus carbon is generated. In addition, this carbon is attached to the surfaces of the central particles of the cathode material for a lithium-ion secondary battery and turns into the carbonaceous film. Therefore, the surfaces of the central particles of the cathode material for a lithium-ion secondary battery are coated with the carbonaceous film.

Here, as the calcination time extends, lithium diffuses into the carbonaceous film from the central particles, lithium is present in the carbonaceous film, and the conductivity of the carbonaceous film further improves.

However, when the thermal treatment time is too long, abnormal grain growth occurs, and central particles in which lithium is partially absent are generated, and thus the characteristics of the cathode material for a lithium-ion secondary battery deteriorate. In addition, the characteristics of lithium-ion secondary batteries for which this cathode material for a lithium-ion secondary battery is used degrade.

Addition of Thermal Conduction Auxiliary Substance

In the method for manufacturing a cathode material of the present embodiment, a thermal conduction auxiliary substance having a higher thermal conductivity than the precursor of the cathode active material is further added so as to prepare the mixture in the step (B) or a thermal conduction auxiliary substance having a higher thermal conductivity than the precursor of the cathode active material is added to the mixture and then the mixture is calcinated in the step (C). That is, when the mixture is prepared, a mixture including the thermal conduction auxiliary substance is prepared or the thermal conduction auxiliary substance is added to the mixture not including the thermal conduction auxiliary substance or including the thermal conduction auxiliary substance and then the mixture is calcinated. In such a case, it is possible to make the temperature distribution in the calcination capsule during the calcination more uniform. As a result, it is possible to suppress the generation of insufficiently-carbonized parts of the organic compound attributed to temperature unevenness in the calcination capsule or the generation of parts of the central particles that are reduced due to carbon.

The thermal conduction auxiliary substance is not particularly limited as long as the substance has a higher thermal conductivity than the precursor of the cathode active material, but is preferably a substance that does not easily react with the precursor of the cathode active material and the cathode active material. This is because, when the thermal conduction auxiliary substance reacts with the cathode active material or the precursor thereof, the battery activity of the cathode active material being obtained after the calcination may be impaired or it becomes impossible to collect and reuse the thermal conduction auxiliary substance after the calcination.

Examples of the thermal conduction auxiliary substance include carbonaceous materials, alumina-based ceramic, magnesia-based ceramic, zirconia-based ceramic, silica-based ceramic, calcia-based ceramic, aluminum nitride, and the like. These thermal conduction auxiliary substances may be used singly or a mixture of two or more thermal conduction auxiliary substances may be used.

The thermal conduction auxiliary substance is preferably a carbonaceous material. Examples of the carbonaceous material that can be used as the thermal conduction auxiliary substance include graphite, acetylene black (AB), vapor-grown carbon fiber (VGCF), carbon nanotube (CNT), graphene, and the like. These thermal conduction auxiliary substances may be used singly or a mixture of two or more thermal conduction auxiliary substances may be used.

The dimensions of the thermal conduction auxiliary substance are not particularly limited, but the average of the lengths of the thermal conduction auxiliary substances in the longitudinal direction is preferably 1 mm or more and 100 mm or less and more preferably 5 mm or more and 30 mm or less from the viewpoint of the thermal conduction efficiency since it is possible to make the temperature distribution in the calcination capsule sufficiently uniform and the amount of the thermal conduction auxiliary substance added is decreased. In addition, it becomes easy to separate the thermal conduction auxiliary substance from the cathode material for a lithium-ion secondary battery using the capsule.

In addition, the thermal conduction auxiliary substance preferably has a greater specific weight than the cathode material for a lithium-ion secondary battery since separation using an air flow-type classifier or the like becomes easy.

The amount of the thermal conduction auxiliary substance added is preferably 1% by volume or more and 50% by volume or less and more preferably 5% by volume or more and 30% by volume or less in a case in which the content of the precursor of the cathode active material or the mixture is set to 100% by volume. When the amount of the thermal conduction auxiliary substance added is 1% by volume or more, it is possible to make the temperature distribution in the calcination capsule sufficiently uniform. On the other hand, when the amount of the thermal conduction auxiliary substance added is 50% by volume or less, it is possible to suppress a decrease in the amount of the precursor of the cathode active material and the organic compound being calcinated in the calcination capsule due to the fraction of the thermal conduction auxiliary substance in the calcination capsule becoming excessively large.

Step of Separating Thermal Conduction Auxiliary Substance

After the calcination, the thermal conduction auxiliary substance and the cathode material for a lithium-ion secondary battery may be separated from each other by passing the mixture of the thermal conduction auxiliary substance and the cathode material for a lithium-ion secondary battery through a sieve or the like. However, when the characteristics of lithium-ion secondary batteries do not deteriorate in spite of the use of the cathode material for a lithium-ion secondary battery including the thermal conduction auxiliary substance, the thermal conduction auxiliary substance may not be separated.

Cathode for Lithium-Ion Secondary Battery

A cathode for a lithium-ion secondary battery of the present embodiment (hereinafter, in some cases, referred to as "cathode") includes the cathode material for a lithium-ion secondary battery of the present embodiment. In more detail, the cathode of the present embodiment includes an electrode current collector made of a metal foil and a cathode mixture layer formed on the electrode current collector, and the cathode mixture layer includes the cathode material for a lithium-ion secondary battery of the present embodiment. That is, the cathode of the present embodiment is obtained by forming a cathode mixture layer on one main surface of the electrode current collector using the cathode material for a lithium-ion secondary battery of the present embodiment.

The cathode of the present embodiment is mainly used as a cathode for a lithium-ion secondary battery.

Since the cathode for a lithium-ion secondary battery of the present embodiment includes the cathode material for a lithium-ion secondary battery of the present embodiment, the elution of transition metal is significantly suppressed, and lithium-ion secondary batteries for which the cathode for a lithium-ion secondary battery of the present embodiment is used are excellent in terms of long-term cycle stability and safety.

Method for Manufacturing Cathode for Lithium-Ion Secondary Battery

The method for manufacturing the cathode for a lithium-ion secondary battery of the present embodiment is not particularly limited as long as a cathode mixture layer can be formed on one main surface of an electrode current collector using the cathode material for a lithium-ion secondary battery of the present embodiment. Examples of the method for manufacturing the cathode of the present embodiment include the following method.

First, the cathode material for a lithium-ion secondary battery of the present embodiment, a binding agent made of a binder resin, and a solvent are mixed together, thereby preparing cathode material paste. At this time, to the cathode material paste in the present embodiment, a conductive auxiliary agent such as carbon black may be added thereto if necessary.

Binding Agent

As the binding agent, that is, the binder resin, for example, a polytetrafluoroethylene (PTFE) resin, a polyvinylidene fluoride (PVdF) resin, fluorine rubber, or the like is preferably used.

The blending amount of the binding agent used to prepare the cathode material paste is not particularly limited and is, for example, preferably 1 part by mass or more and 30 parts by mass or less and more preferably 3 parts by mass or more and 20 parts by mass or less with respect to 100 parts by mass of the cathode material for a lithium-ion secondary battery.

When the blending amount of the binding agent is 1 part by mass or more, it is possible to sufficiently increase the binding property between the cathode mixture layer and the electrode current collector. Therefore, it is possible to prevent the cathode mixture layer from being cracked or dropped during a molding of the cathode mixture layer by means of rolling or the like. In addition, it is possible to prevent the cathode mixture layer from being peeled off from the electrode current collector in a process of charging and discharging lithium-ion secondary batteries and prevent the battery capacity or the charge-discharge rate from being decreased. On the other hand, when the amount of the binding agent blended is 30 parts by mass or less, it is possible to prevent the internal resistance of the cathode material for a lithium-ion secondary battery from being decreased and prevent the battery capacity at a high charge-discharge rate from being decreased.

Conductive Auxiliary Agent

The conductive auxiliary agent is not particularly limited, and, for example, at least one element selected from the group consisting of fibrous carbon such as acetylene black (AB), KETJEN BLACK, furnace black, vapor-grown carbon fiber (VGCF), and carbon nanotube is used.

Solvent

The solvent that is used in the cathode material paste including the cathode material for a lithium-ion secondary battery of the present embodiment is appropriately selected depending on the properties of the binding agent. When the solvent is appropriately selected, it is possible to facilitate the cathode material paste to be applied to substances to be coated such as electrode current collectors.

Examples of the solvent include water, alcohols such as methanol, ethanol, 1-propanol, 2-propanol (isopropyl alcohol: IPA), butanol, pentanol, hexanol, octanol, and diacetone alcohol, esters such as ethyl acetate, butyl acetate, ethyl lactate, propylene glycol monomethyl ether acetate, propylene glycol monoethyl ether acetate, and γ-butyrolactone, ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, and diehtylene glycol monoethyl ether, ketones such as acetone, methyl ethyl ketone (MEK), methyl isobutyl ketone (MIBK), acetylacetone, and cyclohexanone, amides such as dimethyl formamide, N,N-dimethylacetoacetamide, and N-methyl-2-pyrrolidone (NMP), glycols such as ethylene glycol, diethylene glycol, and propylene glycol, and the like. These solvents may be used singly, or a mixture of two or more solvents may be used.

The content rate of the solvent in the cathode material paste is preferably 50% by mass or more and 70% by mass or less and more preferably 55% by mass or more and 65% by mass or less in a case in which the total mass of the cathode material for a lithium-ion secondary battery of the present embodiment, the binding agent, and the solvent is set to 100% by mass.

When the content rate of the solvent in the cathode material paste is in the above-described range, it is possible to obtain cathode material paste having excellent cathode formability and excellent battery characteristics.

A method for mixing the cathode material for a lithium-ion secondary battery of the present embodiment, the binding agent, the conductive auxiliary agent, and the solvent is not particularly limited as long as these components can be uniformly mixed together. Examples thereof include mixing methods in which a kneader such as a ball mill, a sand mill, a planetary (sun-and-planet) mixer, a paint shaker, or a homogenizer is used.

The cathode material paste is applied to one main surface of the electrode current collector so as to form a coated film, and then this coated film is dried, thereby obtaining the electrode current collector having a coated film made of a mixture of the cathode material and the binding agent formed on one main surface.

After that, the coated film is pressed by pressure and is dried, thereby producing a cathode having a cathode mixture layer on one main surface of the electrode current collector.

Lithium-Ion Secondary Battery

A lithium-ion secondary battery of the present embodiment includes a cathode, an anode, and a non-aqueous electrolyte, in which the cathode is the cathode for a lithium-ion secondary battery of the present embodiment. Specifically, the lithium-ion secondary battery of the present embodiment includes the cathode for a lithium-ion secondary battery of the present embodiment as a cathode, an anode, a separator, and a non-aqueous electrolyte.

In the lithium-ion secondary battery of the present embodiment, the anode, the non-aqueous electrolyte, and the separator are not particularly limited.

Anode

Examples of the anode include anodes including an anode material such as Li metal, carbon materials such as natural graphite and hard carbon, Li alloys, $Li_4Ti_5O_{12}$, $Si(Li_{4.4}Si)$, and the like.

Non-Aqueous Electrolyte

Examples of the non-aqueous electrolyte include non-aqueous electrolytes obtained by mixing ethylene carbonate (EC) and ethyl methyl carbonate (EMC) so that the volume ratio reaches 1:1 and dissolving lithium hexafluorophosphate ($LiPF_6$) in the obtained solvent mixture so that the concentration reaches 1 $mol/dm^3$.

Separator

As the separator, it is possible to use, for example, porous propylene.

In addition, instead of the non-aqueous electrolyte and the separator, a solid electrolyte may be used.

Since the lithium-ion secondary battery of the present embodiment includes the cathode for a lithium-ion secondary battery of the present embodiment as the cathode, the oxidation and decomposition of electrolytic solutions and the generation of gas are suppressed, and long-term cycle stability and safety are excellent.

EXAMPLES

Hereinafter, the present invention will be more specifically described using examples and comparative examples, but the present invention is not limited to the following examples.

Example 1

Synthesis of cathode material for lithium-ion secondary battery Lithiumphosphate ($Li_3PO_4$) (1,000 mol) andiron (II) sulfate ($FeSO_4$) (1,000 mol) were added to and mixed with water so that the total amount reached 1,000 L, thereby preparing a homogeneous slurry-form mixture.

Next, this mixture was stored in a pressure-resistant airtight container having a capacity of 2,000 L and was hydrothermally synthesized at 160° C. for 24 hours, thereby generating a precipitate.

Next, this precipitate was cleaned with water, thereby obtaining a cake-form precursor of a cathode active material.

Next, a polyethylene glycol (0.8 kg) as the organic compound and zirconia balls having a diameter of 1 mm as medium particles were used in this precursor of the cathode active material (5 kg in terms of solid contents), and a dispersion treatment was performed in a ball mill for three hours, thereby preparing a homogeneous slurry.

Next, this slurry was sprayed in the atmosphere at 180° C. and dried, thereby obtaining a granulated body of the precursor of the cathode active material which was coated with an organic substance having an average particle diameter of 6 μm.

Graphite sintered bodies having an average length in the longitudinal direction of 10 mm were added to and mixed with the granulated body as the thermal conduction auxiliary substance so that the content thereof reached 30% by volume with respect to 100% by volume of the obtained granulated body, thereby obtaining a raw material for calcination.

This raw material for calcination (5 kg) was laid in a graphite capsule having a volume of 10 L, was calcinated in a non-oxidative gas atmosphere for five minutes at 780° C., and was then held at 40° C. for 30 minutes, thereby obtaining a calcinated substance. This calcinated substance was passed through a sieve having a mesh of 75 μm so as to remove the graphite sintered bodies, thereby obtaining a cathode material A1 of Example 1.

Production of Lithium-Ion Secondary Battery

The cathode material A1, polyvinylidene fluoride (PVdF) as a binding agent, and acetylene black (AB) as a conductive auxiliary agent were added to N-methyl-2-pyrrolidone (NMP) which is a solvent so that the mass ratio (the cathode material A1:AB:PVdF) in paste reached 90:5:5, and the components were mixed together, thereby preparing cathode material paste (for the cathode).

This cathode material paste (for the cathode) was applied onto the surface of a 30 μm-thick aluminum foil (electrode current collector) so as to form a coated film, and the coated film was dried, thereby forming a cathode mixture layer on the surface of the aluminum foil. The thickness of the cathode mixture layer was adjusted so that the capacity ratio between the cathode and the anode reached 1.2 (the anode/the cathode).

After that, the cathode mixture layer was pressed by a predetermined pressure so that the cathode density reached 2.0 g/mL, and a tetragonal piece having a cathode area of 9 cm² was obtained by means of punching using a forming machine, thereby producing a cathode of Example 1.

Next, natural graphite as an anode active material, styrene butadiene rubber (SBR) as a binding agent, and carboxymethyl cellulose (CMC) as a viscosity-adjusting material were added to pure water which was a solvent so that the mass ratio (natural graphite:SBR:CMC) in paste reached 98:1:1, and the components were mixed together, thereby preparing anode material paste (for the anode).

The prepared anode material paste (for the anode) was applied onto the surface of a 10 μm-thick copper foil (electrode current collector) so as to form a coated film, and the coated film was dried, thereby forming an anode mixture layer on the surface of the copper foil. The coating thickness was adjusted so that the weight of the anode mixture layer reached 4.4 mg/cm². The anode mixture layer was pressed by a predetermined pressure so that the anode density reached 1.42 g/mL, and then a tetragonal piece having an anode area of 9.6 cm² was obtained by means of punching using a forming machine, thereby producing an anode of Example 1.

The produced cathode and anodes were made to face each other through a 25 μm-thick polypropylene separator, were immersed in a 1 M $LiPF_6$ solution (0.5 mL) as an electrolytic solution, and then were sealed with a laminate film, thereby producing a lithium-ion secondary battery of Example 1. As the $LiPF_6$ solution, a solution obtained by mixing ethylene carbonate and ethyl methyl carbonate so that the volume ratio reached 1:1 was used.

Example 2

A cathode material A2 of Example 2 was obtained in the same manner as in Example 1 except for the fact that graphite sintered bodies having an average length in the longitudinal direction of 10 mm were added to the granulated body as the thermal conduction auxiliary substance so that the content thereof reached 10% by volume with respect to 100% by volume of the obtained granulated body.

A lithium-ion secondary battery of Example 2 was produced in the same manner as in Example 1 except for the fact that the cathode material A2 was used.

Example 3

A cathode material A3 of Example 3 was obtained in the same manner as in Example 1 except for the fact that graphite sintered bodies having an average length in the longitudinal direction of 10 mm were added to the granulated body as the thermal conduction auxiliary substance so that the content thereof reached 5% by volume with respect to 100% by volume of the obtained granulated body.

A lithium-ion secondary battery of Example 3 was produced in the same manner as in Example 1 except for the fact that the cathode material A3 was used.

Example 4

A cathode material A4 of Example 4 was obtained in the same manner as in Example 1 except for the fact that the calcination temperature was set to 820° C.

A lithium-ion secondary battery of Example 4 was produced in the same manner as in Example 1 except for the fact that the cathode material A4 was used.

Example 5

A cathode material A5 of Example 5 was obtained in the same manner as in Example 1 except for the fact that the calcination temperature was set to 800° C.

A lithium-ion secondary battery of Example 5 was produced in the same manner as in Example 1 except for the fact that the cathode material A5 was used.

Example 6

A cathode material A6 of Example 6 was obtained in the same manner as in Example 1 except for the fact that the calcination temperature was set to 760° C.

A lithium-ion secondary battery of Example 6 was produced in the same manner as in Example 1 except for the fact that the cathode material A6 was used.

Example 7

A cathode material A7 of Example 7 was obtained in the same manner as in Example 1 except for the fact that the calcination temperature was set to 740° C.

A lithium-ion secondary battery of Example 7 was produced in the same manner as in Example 1 except for the fact that the cathode material A7 was used.

Example 8

A cathode material A8 of Example 8 was obtained in the same manner as in Example 1 except for the fact that the calcination temperature was set to 720° C.

A lithium-ion secondary battery of Example 8 was produced in the same manner as in Example 1 except for the fact that the cathode material A8 was used.

Example 9

A cathode material A9 of Example 9 was obtained in the same manner as in Example 1 except for the fact that the calcination temperature was set to 700° C.

A lithium-ion secondary battery of Example 9 was produced in the same manner as in Example 1 except for the fact that the cathode material A9 was used.

Example 10

A cathode material A10 of Example 10 was obtained in the same manner as in Example 1 except for the fact that the calcination temperature was set to 680° C.

A lithium-ion secondary battery of Example 10 was produced in the same manner as in Example 1 except for the fact that the cathode material A10 was used.

Comparative Example 1

A cathode material C1 of Comparative Example 1 was obtained in the same manner as in Example 1 except for the fact that graphite sintered bodies were not added to the obtained granulated body.

A lithium-ion secondary battery of Comparative Example 1 was produced in the same manner as in Example 1 except for the fact that the cathode material C1 was used.

Comparative Example 2

A cathode material C2 of Comparative Example 2 was obtained in the same manner as in Example 1 except for the fact that the calcination temperature was set to 840° C.

A lithium-ion secondary battery of Comparative Example 2 was produced in the same manner as in Example 1 except for the fact that the cathode material C2 was used.

Comparative Example 3

A cathode material C3 of Comparative Example 3 was obtained in the same manner as in Example 1 except for the fact that the calcination temperature was set to 660° C.

A lithium-ion secondary battery of Comparative Example 3 was produced in the same manner as in Example 1 except for the fact that the cathode material C3 was used.

Evaluation of Cathode Material for Lithium-Ion Secondary Battery and Lithium-Ion Secondary Battery The cathodes material for a lithium-ion secondary battery and the lithium-ion secondary batteries of Examples 1 to 10 and Comparative Examples 1 to 3 were evaluated as described below.

1. Average Primary Particle Diameter

Thirty primary particles of the cathode material for a lithium-ion secondary battery which were observed using a scanning electron microscope (SEM) were randomly selected, and the average primary particle diameter of the 30 primary particles was considered as the average primary particle diameter.

2. Amount of Carbon

The amount of carbon in the cathode material for a lithium-ion secondary battery was measured using a carbon/sulfur analyzer (manufactured by Horiba Ltd., trade name: EMIA-220V).

3. Raman Spectrum

One earpick amount of the randomly-selected powder of the cathode material for a lithium-ion secondary battery was placed on a preparat for Raman spectroscopic measurement using a spatula, and measurement was carried out under the following conditions at the four corners and the center of the collection of the powder as visual fields of individual measurement points. As the measurement subject being placed on the preparat, different randomly-selected powder of the cathode material for a lithium-ion secondary battery was placed, and the same measurement was repeated five times.

Measurement Conditions

Device: NRS-3100

Exposure time: 50 seconds

Cumulated number: 10 times

Central wavelength: 1,300 $cm^{-1}$

Slit: 0.01 mm×6 mm

Objective lens magnification: 100 times

Reducer: Optical density (OD) 3

4. Charge and Discharge Test

When the depth of discharge of the discharge capacity of the lithium-ion secondary battery which was, in an environment of 25° C., constant-current-charged at a current value of 0.1 C until the battery voltage reached 3.7 V and was then constant-current-discharged at a current value of 5 C until the battery voltage reached 2.5 V was considered as 100%, the battery voltage of the lithium-ion secondary battery which was constant-current-charged and was then constant-current-discharged at a current value of 0.1 C until the depth of discharge reached 90% was indicated by D1, the battery voltage of the lithium-ion secondary battery which was constant-current-charged and was then constant-current-discharged at a current value of 5 C until the depth of discharge reached 90% was indicated by D2, and (D1−D2) was evaluated as a parameter that indicated reaction unevenness in the cathode.

Evaluation Results

The evaluation results of the cathode materials for a lithium-ion secondary battery and the lithium-ion secondary batteries of Examples 1 to 10 and Comparative Examples 1 to 3 are shown in Tables 1 and 2.

Figure 1:
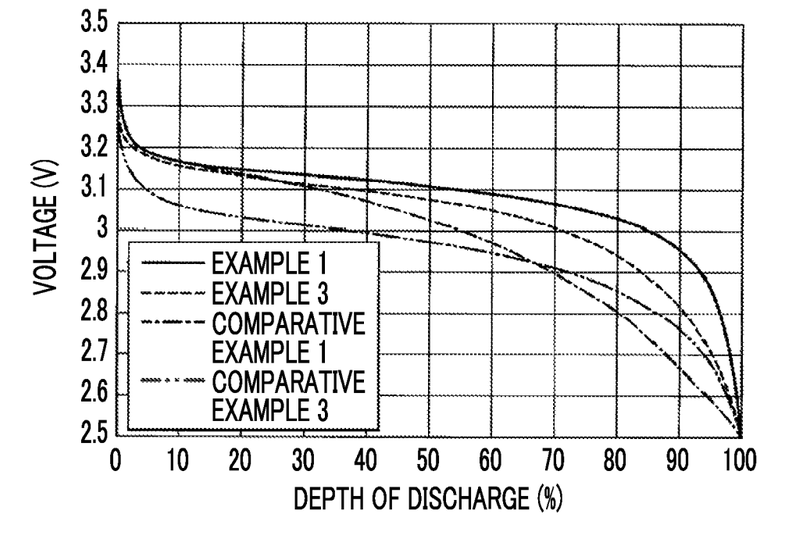
FIG. 1 is a view illustrating discharge curves at a current value of 5 C in charge and discharge tests in Examples 1 and 3 and Comparative Examples 1 and 3.

In addition, the discharge curves at a current value of 5 C in the charge and discharge tests in Examples 1 and 3 and Comparative Examples 1 and 3 are illustrated in FIG. 1. For the curves illustrated in FIG. 1, the vertical axis indicates the battery voltage [V], and the horizontal axis indicates the discharge capacity.

TABLE 1

|  | Mixing ratio of graphite sintered bodies [% by volume] | Calcination temperature (° C.) | R value (1) | R value (2) | R value (3) | R value (4) | R value (5) | Five-point average value of R values | Five-point standard deviation of R values |
|---|---|---|---|---|---|---|---|---|---|
| Example 1 | 30 | 780 | 0.903 | 0.897 | 0.903 | 0.906 | 0.899 | 0.90 | 0.004 |
| Example 2 | 10 | 780 | 0.908 | 0.899 | 0.912 | 0.919 | 0.912 | 0.91 | 0.007 |
| Example 3 | 5 | 780 | 0.898 | 0.923 | 0.915 | 0.910 | 0.908 | 0.91 | 0.009 |
| Example 4 | 30 | 820 | 0.811 | 0.820 | 0.834 | 0.822 | 0.818 | 0.82 | 0.008 |
| Example 5 | 30 | 800 | 0.859 | 0.871 | 0.860 | 0.850 | 0.867 | 0.86 | 0.008 |
| Example 6 | 30 | 760 | 0.942 | 0.947 | 0.945 | 0.938 | 0.945 | 0.94 | 0.004 |
| Example 7 | 30 | 740 | 0.979 | 0.986 | 0.990 | 0.971 | 0.982 | 0.98 | 0.007 |
| Example 8 | 30 | 720 | 1.012 | 1.021 | 1.034 | 1.023 | 1.020 | 1.02 | 0.008 |
| Example 9 | 30 | 700 | 1.046 | 1.041 | 1.043 | 1.039 | 1.040 | 1.04 | 0.003 |
| Example 10 | 30 | 680 | 1.099 | 1.098 | 1.085 | 1.102 | 1.090 | 1.09 | 0.007 |
| Comparative Example 1 | None | 780 | 0.932 | 0.903 | 0.965 | 0.987 | 0.947 | 0.95 | 0.032 |
| Comparative Example 2 | 30 | 840 | 0.790 | 0.784 | 0.790 | 0.792 | 0.789 | 0.79 | 0.003 |
| Comparative Example 3 | 30 | 660 | 1.130 | 1.148 | 1.135 | 1.147 | 1.138 | 1.14 | 0.008 |

TABLE 2

|  | Mixing ratio of graphite sintered bodies [% by volume] | Calcination temperature (° C.) | Average primary particle diameter of cathode material [nm] | Amount of carbon (parts by mass) | Battery voltage D1 at depth of discharge of 90% (current value 0.1 C) [V] | Battery voltage D2 at depth of discharge of 90% (current value 5 C) [V] | D1 − D2 [V] |
|---|---|---|---|---|---|---|---|
| Example 1 | 30 | 780 | 143 | 1.21 | 3.19 | 2.95 | 0.24 |
| Example 2 | 10 | 780 | 145 | 1.26 | 3.19 | 2.90 | 0.29 |
| Example 3 | 5 | 780 | 141 | 1.25 | 3.23 | 2.81 | 0.42 |
| Example 4 | 30 | 820 | 153 | 1.12 | 3.19 | 2.87 | 0.32 |
| Example 5 | 30 | 800 | 148 | 1.19 | 3.20 | 2.95 | 0.25 |
| Example 6 | 30 | 760 | 133 | 1.28 | 3.19 | 2.93 | 0.26 |
| Example 7 | 30 | 740 | 135 | 1.27 | 3.20 | 2.90 | 0.30 |
| Example 8 | 30 | 720 | 131 | 1.31 | 3.21 | 2.88 | 0.33 |
| Example 9 | 30 | 700 | 130 | 1.34 | 3.20 | 2.83 | 0.37 |
| Example 10 | 30 | 680 | 127 | 1.37 | 3.21 | 2.80 | 0.41 |
| Comparative Example 1 | None | 780 | 132 | 1.31 | 3.22 | 2.67 | 0.55 |
| Comparative Example 2 | 30 | 840 | 169 | 1.02 | 3.18 | 2.70 | 0.48 |
| Comparative Example 3 | 30 | 660 | 128 | 1.45 | 3.22 | 2.76 | 0.46 |

When Examples 1 to 10 and Comparative Example 1 are compared using the results of Tables 1 and 2, it is confirmed that Examples 1 to 10 in which the five-point standard deviation of the R values ($I_{1580}/I_{1360}$) was 0.010 or less had a (D1−D2) that was as small as 0.45 V or less and had favorable input and output characteristics in which reaction unevenness in the cathode was small.

In addition, when Examples 1 to 10 and Comparative Examples 2 and 3 are compared, it is confirmed that Examples 1 to 10 in which the five-point average value of the R values ($I_{1580}/I_{1360}$) was 0.80 or more and 1.10 or less had a (D1−D2) that was as small as 0.45 V or less and had favorable input and output characteristics.

Lithium-ion secondary batteries for which the cathode material for a lithium-ion secondary battery of the present invention is used have excellent input and output characteristics, and are thus capable of significantly contributing to the advancement of the reliability of lithium-ion secondary batteries commencing with mobile body applications.

What is claimed is:

1. A cathode material for a lithium-ion secondary battery, comprising:

central particles represented by $Li_xA_yM_zPO_4$, wherein $0 \le x \le 1.1$, $0.8 \le y \le 1.1$, and $0 \le z \le 0.2$, A represents at least one element selected from the group consisting of Fe, Mn, Co, and Ni, and M represents at least one element selected from the group consisting of Mg, Ca, Co, Sr, Ba, Ti, Zn, B, Al, Ga, In, Si, Ge, and rare earth elements; and a carbonaceous film that coats surfaces of the central particles, wherein an average value of R values ($I_{1580}/I_{1360}$), which are ratios of a peak intensity ($I_{1580}$) of a spectrum at a frequency band of 1,580±50 $cm^{-1}$ to a peak intensity ($I_{1360}$) of the spectrum at a frequency band of 1,360±50 $cm^{-1}$ in a Raman spectrum analysis, measured at five points is 0.82 or more and 0.98 or less, and a standard deviation of the R values measured at five points is 0.004 or more and 0.008 or less.

2. The cathode material for a lithium-ion secondary battery according to claim 1, wherein the average value of R values ($I_{1580}/I_{1360}$), which are the ratios of the peak intensity ($I_{1580}$) of the spectrum at the frequency band of 1,580±50 $cm^{-1}$ to the peak intensity ($I_{1360}$) of the spectrum at the frequency band of 1,360±50 $cm^{-1}$ in the Raman spectrum analysis, measured at five points is 0.83 or more and 0.97 or less, the standard deviation of the R values measured at five points is 0.004 or more and 0.008 or less, an average primary particle diameter is 50 nm or more and 300 nm or less, an amount of carbon forming the carbonaceous film is 0.6 parts by mass or more and 3 parts by mass or less with respect to 100 parts by mass of the central particles, and when a depth of discharge of a discharge capacity of the lithium-ion secondary battery which is, in an environment of 25° C., constant-current-charged at a current value of 0.1 C until a battery voltage reaches 3.7 V and is then constant-current-discharged at a current value of 5 C until the battery voltage reaches 2.5 V is considered as 100%, the battery voltage of the lithium-ion secondary battery which is constant-current-charged and is then constant-current-discharged at a current value of 0.1 C until the depth of discharge reaches 90% is indicated by D1, and the battery voltage of the lithium-ion secondary battery which is constant-current-charged and is then constant-current-discharged at a current value of 5 C until the depth of discharge reaches 90% is indicated by D2, (D1−D2) is 0.45 V or less.

3. The cathode material for a lithium-ion secondary battery according to claim 1, wherein the central particles are represented by $Li_xFe_{1-z}M_zPO_4$, wherein $0 \leq x \leq 1.1$, and $0 \leq z \leq 0.2$, and M represents at least one element selected from the group consisting of Mg, Ca, Co, Sr, Ba, Ti, Zn, B, Al, Ga, In, Si, Ge, and rare earth elements.

4. A cathode for a lithium-ion secondary battery, comprising:

an electrode current collector; and a cathode mixture layer formed on the electrode current collector, wherein the cathode mixture layer includes the cathode material for a lithium-ion secondary battery according to claim 1.

5. A lithium-ion secondary battery comprising:

the cathode for a lithium-ion secondary battery according to claim 4.

* * * * *